United States Patent [19]

Chin et al.

[11] Patent Number: 4,835,210

[45] Date of Patent: May 30, 1989

[54] WATER EMULSIFIED KETOXIME BLOCKED POLYURETHANE

[75] Inventors: James Chin, Cheshire; Ajaib Sing, Shelton, both of Conn.

[73] Assignee: Uniroyal Chemical Company, Inc., Middlebury, Conn.

[21] Appl. No.: 199,978

[22] Filed: May 27, 1988

[51] Int. Cl.$^4$ .............................................. C08L 75/04
[52] U.S. Cl. ................................. 524/732; 524/874; 528/45; 528/64; 528/65
[58] Field of Search ................... 524/732, 874; 528/45, 528/64, 65

[56] References Cited

FOREIGN PATENT DOCUMENTS 778481 2/1968 Canada .

Primary Examiner—Maurice J. Welsh
Attorney, Agent, or Firm—Raymond D. Thompson

[57] ABSTRACT

Water emulsifiable ketoxime blocked polyol prepolymers which can be further mixed with a low melting diamine or diol curative and water to make a very low viscosity storage stable, castable, reactive mixture. The water and volatile ketoxime are driven off to form a polyurethane with excellent physical properties.

33 Claims, No Drawings

WATER EMULSIFIED KETOXIME BLOCKED POLYURETHANE

BACKGROUND OF THE INVENTION

This invention relates to elastomeric polyurethane and/or polyurea products and more particularly to an effective process for the water emulsification of liquid urethane prepolymer having blocked isocyanate curing sites which can be activated by heating, thus enhancing the utility of these copolymers to industrial processes.

It is known that "pot life" can be increased by blocking reactive isocyanato groups in isocyanato reactive systems by adding an active hydrogen compound capable of forming an essential unreactive adduct which at elevated temperatures, e.g., higher than 70° C., returns the isocyanate groups to a reactable condition. Many compounds for blocking isocyanato groups are named in the prior art including Canadian Patent No. 778,481, which discloses the use of volatile ketoximes, e.g., methyl ethyl ketoxime.

Presently, only certain organic solvent systems are used when solvents are needed for use with liquid urethane prepolymers. It would be extremely beneficial if organic solvents could be eliminated from these systems, e.g., reduce fire and health hazards, reduce cost, eliminate recycling solvent, etc.

Surprisingly, it has been found that blocked prepolymer can be emulsified in water by use of certain non-reactive or at least low reactivity emulsifiers. The emulsified product has very low viscosities in the emulsified state. This product is unique and there is no industrial precedence.

BRIEF DESCRIPTION OF THE INVENTION

The amount of emulsifiers in the prepolymer of the instant invention allows for the emulsification of a curative, e.g., methylenedianiline (MDA) when added into the system.

The elastomeric vulcanizates thus obtained are essentially equivalent to nonaqueous diamine cured blocked prepolymer vulcanizates.

It is therefore an object of the instant invention to provide a method for preparing polyurethane products derived from reactive difunctional isocyanates which are blocked for an aqueous processing medium. This method is carried out by reacting an organic diisocyanate with a polyether or polyester polyol to form a prepolymer having terminal isocyanate groups, blocking the reactive curing sites with a ketoxime and adding emulsifiers. This is followed by emulsification in water thereby providing protracted stable, unreactive storage of the prepolymer in the presence of moisture and curatives. Preferably, the method can be used to form linear copolymers having the desired degree of toughness and elasticity by adding liquid (or molten) diamine and/or diol curatives to this emulsifiable blocked prepolymer and subsequently heating the system to remove the water and deblock the isocyanate groups allowing a reaction with the curative, thereby forming a tough elastomeric polyurethane polymer.

One aspect of the invention is a method of manufacturing a water emulsifiable isocyanate endcapped polyalkylene polyol prepolymer comprising the steps of: (a) contacting a polyalkylene polyol with a stoichemetric excess of an organic diisocyanate to form an isocyanate endcapped polyalkylene polyol prepolymer having an excess of free isocyanate; (b) reacting said isocyanate endcapped polyalkylene polyol prepolymer with a ketoxime in an amount sufficient to react with the free isocyanate groups of the prepolymer to form ketoxime blocked isocyanate endcapped polyalkylene polyol prepolymer with a slight excess of ketoxime; (c) mixing said ketoxime blocked prepolymer with a non-reactive or slow reacting emulsifier to form a water emulsifiable prepolymer; (d) blending said emulsifiable prepolymer into water to form a stable emulsion; and (e) adding to said emulsion a curative selected from the group consisting of organic diamines and/or organic diols with selective emulsifiers to form a stable reactive emulsion.

The preferred aspect of the invention, however, is a method of manufacturing a polyurethane from a water emulsion system comprising the steps of: (a) blending a mixture of a curative selected from the group consisting of organic diamines and organic diols with a ketoxime-blocked isocyanate endcapped polyalkyleneether polyol prepolymer with a no-reactive emulsifier to form a reactive, emulsifiable mixture; (b) dispersing said mixture in water to form a stable reactive emulsion; (c) removing said water from said stable reactive emulsion; (d) volatilizing a free ketoxime from said stable reactive prepolymer to yield an unblocked isocyanate endcapped polyalkylene ether glycol prepolymer in the presence of said curvative; and (f) reacting said curative and said unblocked isocyanate endcapped polyalkylene polyol prepolymer to form a polyurethane. Of course the same technique may be utilized with other polyether polyols, polyester polyols, hydroxy terminated polybutadiene, isoprene, acrylonitrile or styrene type compounds.

DETAILED DESCRIPTION OF THE INVENTION

The term, emulsion, and the related terms, emulsifiable, emulsification, etc., are used herein to broadly describe a heterogenuous system consisting of at least one immiscible liquid intimately dispersed in another in the form of fine droplets. This term, emulsion, is meant to encompass the concept of a dispersion and its related terms as well. It is recognized that an emulsion as used herein has a degree of instability inherent in it. This instability implies that the emulsion may tend to temporarily separate into its two phases over a period of time, but the original emulsified state can be readily restored by vigorous agitation.

Polyether glycols or polyester glycols having a number average molecular weight of at least 250 are used to prepare the prepolymer of the instant invention. The preferred polyalkyleneether glycols may be represented by the general formula HO(RO)H, wherein R is an alkylene radical which may be the same or different and n is an integer large enough that the polyether glycol has a number average molecular weight of at least 250. These polyalkyleneether glycols are well-known components of polyurethane products and can be prepared by the polymerization of cyclic ethers such as alkylene oxides and glycols, dihydroxyethers, and the like by known methods.

Polytetramethyleneether glycol and polypropyleneether glycol are the preferred polyalkyleneether glycols. Molecular weights of about 650 to 2000 are preferred, however, the molecular weights of the polyether glycols may be as high as 10,000 or lower than 650.

The polyesters are prepared by reaction of dibasic acids (usually adipic acid but other components such as sebaasic or phthalic acid may be present) with diols such as ethylene glycol, 1,2-propylene glycol, 1,4-butylene glycol and diethylene glycol, etc, where linear polymer segments are required, or include units of higher functionality such as glycerol, trimethylolpropane, pentaerythritol, sorbitol, etc., if chain branching or ultimate crosslinking is sought. Some polyesters also employ caprolactone and dimerized unsaturated fatty acids in their manufacture. Another type of polyester which is of interest is that obtained by the addition polymerization of ε-caprolactone in the presence of an initiator. Other polyols that can be used are those that have at least two hydroxy groups and whose basic backbone is obtained by polymerization or copolymerization of such monomers as butadiene, isoprene, acrylonitrile and styrenic monomers.

The prepolymers are prepared by reaction of the above described polyols with an excess of an organic diisocyanate. Any conventional diisocyanate may be utilized. The preferred diisocyanates are those which hve both isocyanato groups attached to an aromatic nucleus, e.g., 2,4-toluene diisocyanate, 2,6-toluene diisocyanate, m-phenylene diisocyanate, 4,4'-methylene bis(phenylisocyanate) and bis(4 isocyanatocyclohexyl) methane. Mixtures of two or more diisocyanates may be employed.

The reaction between the polyols and the diisocyanate to prepare the prepolymers may be carried out by any of the procedures well known in the art. The details of this aspect of the invention need not be repeated for the skilled artisan.

The reaction of free isocyanato groups of the prepolymer with ketoximes occurs immediately at room temperature and the free isocyanato groups are blocked. The N-carbamyloxyimine structure formed exists in reversible equilibrium with the isocyanato and ketoxime groups from which they are formed. At room temperature the isocyanato groups remain blocked, while at elevated, or "curing" temperature, usually 80° C. or higher, the isocyanato groups unblock the formation of the free ketoxime. At this point and in the presence of isocyanate groups react rapidly with the chai- extending agent. Readily volatile ketoximes are especially useful for the purpose of this invention. Ketoximes of molecular weight loss than about 200 have sufficient volatility, with the lower and molecular weight the better. Representative ketoximes that can be employed are acetone oxime, methyl ethyl ketone oxime, methyl isobutyl ketone oxime, cyclohexanone oxime, acetophenone oxime, benzophenone oxime, etc. The invention is not limited by the particular ketoxime employed, so long as the ketoxime adduct with the isocyanate groups deblocks at reasonable processing temperatures (preferably 80° C. to 200° C.) to allow the chain-extending reaction between free isocyanato groups and diamine.

In forming the emulsified prepolymer with incorporated curative, the weight precentage of emulsifiable prepolymer/curative mix to water can vary from 25 to 75 percent solid by weight. However, at 75 percent solids the emulsion may become too viscous to be useful for casting or coating operations. The preferred ratio is 60-70 parts of emulsifiable prepolymer-curative mix to 30-40 parts water by weight (see Table I, FIGS. 1 and 2).

EMULSIFIERS

The term, non-reactive emulsifier, means a surface active agent which does not enter into either the blocking reaction or the polyurethane forming reaction or which does react at such a low rate as to be effectively non-reactive under the conditions and duration of use. Selection of a suitable non-reactive emulsifier is within the knowledge of one skilled in the art. The selection may require a small amount of experimentation to obtain an optimum emulsifier. It is to be appreciated that the term, emulsifier, encompasses the use of an emulsifier package of more than one material. A skilled artisan would refer to *McCutcheon's Detergents and Emulsifiers,* M.C. Publishing Corp., Glen rock, New Jersey (1987 North American Edition); U.S. Pat. No. 2,514,916, Columns 2 to 4; and U.S. Pat. No. 2,547,734, Columns 3 and 4, provide detailed examples of emulsifiers. The emulsifiers may be anionic, non-ionic or cationic.

A simple screening test will determine whether a particular material is a "emulsifier" for use in this invention: mix 10 parts of the emulsifier to be evaluate into 100 parts by weight of the ketoxime blocked prepolymer to be emulsified. Heat the mixture to 60°-70° C. and slowly add the mixture to 100 parts by weight of water, preheated to 65° C. Agitate vigorously with a mixer (i.e., Silverson L4R mixer). If a homogenous disperson or emulsion results from the agitation, the candidate material is an emulsifier.

A preferred class of emulsifiers are the polyol surfactants. The polyol surfactants referred to herein are described in detail in *Nonionic Surfactants* edited by Martin Schick and published by Dekker, N.Y. (1967). They contain the residue of a polyhydroxy compound as the hydrophilic moiety in ester combination with hydrophobic groups derived from fatty acids. Polyol starting materials include straight-chain polyhydroxy compounds with two to six hydroxyl groups per chain, pentaerythritol, polyglycerols, carbohydrates, and polyoxyalkylene derivatives of triol and higher polyol fatty acid esters. Representative variations are listed below and they may be used in mixtures with ach other as well as with other materials to form a suitable stable dispersion or emulsion. Ethylene glycol and propylene glycol esters such as ethylene glycol monolaurate, ethylene glycol monopalmitate, ethylene glycol monostearate, ethylene glycol monooleate, propylene glycol monolaurate, propylene glycolmoopalmitate, 1-propylene glycolmonostearts, 2-propylene glycol monosterate, propylene glycol monostearate (mixed isomers), about 80%, 10-monoester; polyglycerol esters such as triglycerol monostearate, hexaglycerol monostearate, hexaglycerol monooleate, decaglycerol monolaurate, decaglycerol monopalmitate, decaglycerol monostearate, decaglycerol tristearate, decaglycerol monooleate, decaglycerol tetraoleate; tetritol and pentitol esters such as erythritol monopalmitate, pentaerythritol monolaurate, pentaerythritol monopalmitate, pentaerythritol monostearate; hexitol esters such as sorbitan monolaurate, mannitol monolaurate, sorbitol dilaurate, mannitol dilaurate, mannitol 3,4-dilaurate, sorbitol monostearate; sorbitan tristearate, sorbitan monooleate, sorbitan sesquioleate, sorbitan trioleate; polyoxyethylene sorbitan esters such as polyoxyethylene, polyoxyethylene sorbitan monolaurate, polyoxyethylene sorbitan-monopalmitate, polyoxethylene sorbitan monostearate, polyoxyethylene sorbitan tristearate, polyoxyethylene sorbitan monooleate, polyoxyethylene sorbitan trioleate.

Generally, the diamine or diol having melting point of 100° C. or less and boiling point greater than 125° C. would be useful in the present invention. If melting point is above 100° C., then plasticicizers may be used to lower the effective melting point of the curative. These diamines or diol are generally the present ones used in the industry as curatives for polyurethane. The selection of a curative are generally based on reactivity needs, or property needs for a specific application, process condition needs, and pot life desired. Of course, known catalysts may be used in conjunction with the curative. The screening test of a usefulness of a curative can be determined by mixing the curative with catalysts if desired to 10 gm of ketoxime blocked prepolymers, and spread and mixture on a petri dish and oven cured the sample. If the sample is "hard" cured within the process time desired it would be sufficient to be useful in the present invention. The oven temperature for the diamine curative should be 270° F. (135° C.) and the diol curative at 315° F. for the screening test. Desired process time is generally less than 3 hours, with times as little as 15 minutes being appropriate for some manufacturing processes.

The curative used to blend into the emulsifiable blocked prepolymer can be selected from a wide variety of conventional and well known organic diamine or diol materials. Preferred materials are the aromatic diamines which are either low melting solids or liquids. Specifically preferred are the diamines or diols having a melting point below 100° C.

Representative of the most preferred materials are: methylene dianiline (MDA), diethyl toluene diamine (DETDA); tertiary butyl toluene diamine (TBTDA) dimethyl thiotoluene diamine (Ethacure TM 300) from Ethyl Corporation and 4,4'-methylene-bis(3-chloro-2,6-diethyl)aniline (MCDEA) trimethylene glycol di-p-aminobenzonate (Polacure TM 740, Polaroid Corp.).

The usefulness of the instant invention resides in the many options it gives processors with respect to preparing, applying and chain-extending these aqueous emulsions of blocked prepolymers. The blocked and water emulsified prepolymers are stable and essentially completely resistant to the deteriorative effects of the water. When they are mixed with chain-extending diamines, the mixture is stable at room temperature for long periods to allow for commercial processing. When chain-extending of the mixture to the final product is desired, simple heating, preferably at or below 100° C., will evaporate the water and heating at temperatures over 100° C. will cause reaction to give highly desirable polyurethane/polyurea compositions with superior toughness and abrasion resistance.

The following examples, in which parts and percents are by weight unless otherwise indicated are illustrative of the present invention and are therefore not intended as a limitation on the scope thereof.

EXAMPLE 1

Preparation of Prepolymer

A prepolymer is prepared under nitrogen in a reactor by slowly adding, with stirring, 63.11 parts of polytetramethyleneether glycol having a number average molecular weight of about 1000 to 24.56 parts of 2,4-toluene diisocyanate at 30°-40° C. As the temperature begins to rise, cooling water is circulated around the reaction vessel to remove the heat of reaction. The rate of addition of the polytetramethyleneether glycol is controlled to allow the exotherm not to go over about 80° C. The temperature is controlled at 80±5° C. for 2 hours or until an isocyanate content of 6.4% is obtained.

EXAMPLE 2

Preparation of Blocked Prepolymer

To one hundred parts of prepolymer in a reactor under nitrogen at 50°-65° C. prepared as in Example 1 is slowly added 14.06 parts of methyl ethyl ketoxime (0.35% water content) with stirring. The addition rate is adjusted so that the temperature does not exceed 80° C. and is controlled at about 79°-80° C. for one hour. The free isocyanate content rapidly falls to a undetectable level. The critical factor for protractive stability in water emulsion requires that the free isocyante be nil or slight residual excess of methyl ethyl ketoxime remains to insure comlpete blocking of all the free isocyante. The reaction mixture is cooled immediately to 60° C. and 1.7 parts of polyoxyethylene sorbitan monooleate and 9.7 parts of sorbitan Monooleate are blended into the prepolymer. The resulting "blocked" composition has properties summarized in Table I.

TABLE 1

| PREPOLYMER** PROPERTIES | |
|---|---|
| TOTAL % ISOCYANATE | 5.10 |
| BROOKFIELD VISCOSITY (50° C. cps) | 12.5 M |
| FORM AT 30° C. | Clear Liquid |

EXAMPLE 3

Preparation of Aqueous Dispersed Prepolymer with p,p'-Methylene dianiline

Molten p,p'-methylene dianiline was prepared by preheating it to 100° C. Then 6.13 parts were slowly added, wtih agitation, into 53.87 parts of emulsifiable, disperseable prepolymer prepared as in Example 2 which had been preheated to 60°-70° C. The temperature of the final mixture is 65°-70° C. The resulting blend is added to 40 parts of water also heated to 65°-71° C. with vigorous agitation using an Arde-Batinco (Mohawk, N.J.) mixer*. After all the prepolymer-MDA blend had been added to the water and mixed for about 1½ minutes, the dispersion is removed from the heat and cooled. The viscosity of various concentrations is given in Table II.

*Almost any high speed agitator with some shear will do a good job (Example Silverson Model L4R mixer).

TABLE II

| | VISCOSITY RESULTS | | |
|---|---|---|---|
| | Results Brookfield Viscosity, cps | | |
| % Solid* | @ 61° C. | @ RT (cooled) | @ RT after 48 Hrs. |
| 55 | 25 | 70 | 130 |
| 60 | 50 | 225 | 370 |
| 65 | 210 | 850 | 1220 |
| 70 | 425 | 1175 | 2000 |

% Solid is = (Wt. Blocked Prepolymer of Example 2 + MDA) × 100 / (Wt. Blocked Prepolymer of Example 2 + MDA) + Wt. Water

*Water contents are varied from Example 3 to yield different % solids.

EXAMPLE 4

The reactive emulsion 11.5 gm, of Example 3 was poured out into a 5" petri dish (to give a dry film of ~0.010" when cured). The dish was placed into a vacuum oven at 80° C. (to avoid reaction) for 2 hours which is sufficient time to evaporate the water. The water free material was then heated to 130° C. for ½ hours to unblock the prepolymer and to fully react the free NCO groups of the prepolymer with MDA (curative) to form a finished polyurethane film. Physical properties were run as shown in Table III.

It is to be noted that the water can be simply allowed to evaporate without heating. Alternately, a vacuum can be applied to flash off the water if that is desirable for the particular commercial process being run.

EXAMPLE 5

Example 5 uses a liquid diamine as a curative in the preparation of aqueous dispersed prepolymer.

A sample of blocked prepolymer was prepared by the method of Example 2 with the same emulsifiers of Example 2 and was cured with DETDA (diethyl toluene diamine) with 0.5% of the curative of a dual catalyst system (90/10 oleic acid/DABCO TMR)[TM],

| Ingredient | Weight % |
|---|---|
| DETDA, with 0.5% catalyst (90/100 oleic/TMR) | 5.81 |
| Example 2 prepolymer | 56.13 |
| Water | 38.06 |

With the diserson conditions of Example #3, the viscosity of the solution was only 100 cps @ RT and 50 CPS @ 65° C. The dispersion was removed (after 1½ min. mixing) from the mixer for testing. A film was cast, dried, and cured according to Example 4. The physical properties of the elastomer sample are reported below on Table III.

EXAMPLE 6

A prepolymer made by Example 1 procedure and blocked according to Example 2 procedure was made having an % of 3.6 and a free ketoxime of 1%.

| Recipe | |
|---|---|
| Ingredients | Parts |
| Preopolymer Composition | |
| 2,4-toluene diisocyanate | 23.12 |
| poly(tetramethyleeneether)glycol-(1000 m. wt.) | 76.88 |
| | 100.00 |
| Blocked prepolymer with: (100 pt) MEKO | 10.44 |
| Emulsifier Addition | |
| polyoxyethylene sorbitan monooleate | 1.65 |
| sorbitan monooleate | 9.39 |

A water dispersion was made with melted MDA (100° C.) at 95% theory and was added to the emulsified prepolymer prepared above using conditions similar to Example 3.

| Ingredient | Weight % |
|---|---|
| MDA (95% of theory) | 4.69 |
| Prepolymer with emulsifier | 57.31 |
| Water | 38.00 |

The viscosity results of the water dispersion are 75 cps E 62° C. and 250 cps @ 20° C.

EXAMPLE 7

A PPG/MDI prepolymer was made by Example 1 procedure and blocked according to example 2 procedure utilizing an MDI. The MDI was introduced as a melt at 50°-60° C. during charging. The recipe below summarizes the materials used.

| Prepolymer Composition | Parts by Weight |
|---|---|
| Bis (4-isocyanatophenyl)methane | 29.56 |
| Polypropylene ether glycol-1000 (Equiv. Wt. = 507) | 70.44 |
| Total | 100.00 |
| Blocked prepolymer with MEKO (at 1.0% excess free MEKO) | 9.50 |
| Emulsifier Addition | |
| Polyoxyethylene sorbitan monooleate | 1.64 |
| Sorbitan monooleate | 9.31 |
| Prepolymer Properties of Example #7 (Blocked with emulsifier incorporated) | |
| % total NCO | 3.30 |
| % free MEKO | 1.00 |
| Prepolymer viscosity cps | |
| 50° C. | 32,000 |
| 70° C. | 10,800 |
| Water Dispersion of Reactive Mixture | | |
| Ingredients | Conditions | Weight, % |
| Prepolymers #7 | 70° C. | 58.07 |
| DETDA (95% of Theory) | 70° C. | 3.89 |
| Water | 65° C. | 38.04 |

The dispersion procedure utilized was similar to Example 3. DETDA was added (liquid heated to 70° C.), into the blocked prepolymer of Example 7 with the emulsifiers incorporated therein. The curative-containing mixture was slowly added to water and agitated with an Arde-Batrico mixer to make the dispersion.

The water dispersion viscosity at 63° C. was 50 cps. An 0.25 mm (0.010 inch) film was cast (solid content 7.0 gm in a 5" dish). The cast film was dried overnight at room temperature to evaporate water. It was heated at 160° C. for 1½ hours to cure film. (Post cure overnight at 100° C. is desirable to optimize properties).

EXAMPLE 8

(example of polyester polyol - polycaprolactone/TDI type).

Procedure is similar to Examples 1 and 2.

| Prepolymer composition | Parts |
|---|---|
| TDI | 25.23 |
| Polycaprolactone tone 0221 (Equiv. Wt. = 501) | 74.67 |
| Total | 100.00 |
| Blocked prepolymer with MEKO (at 1.0% excess of free MEKO) | 13.45 |
| Emulsifier Addition | |
| Polyoxyethylene sorbitan monooleate | 1.70 |
| Sorbitan monooleate | 9.64 |
| Prepolymer properties of example #8 (Blocked, with emulsifiers added) | |
| % total NCO | 4.60 |
| % free MEKO | 1.00 |
| % free NCO | 0.00 |
| The prepolymer viscosity, cps were: | |
| 50° C. | 6300 |
| 70° C. | 2500 |

The water dispersion procedure was the same as previous examples:

| Ingredient | Condition | Weight % |
|---|---|---|
| prepolymer #8 | 70° C. | 56.17 |
| DETDA (95% theory) | 69° C. | 5.78 |
| water | 65° | 38.05 |

The water dispersion viscosity was 100 cps at 63° C. A film (0.25 mm) was cast, then allowed to dry overnight at room temperature, cure at 160° C. for 1½ hours, post cure at 100° C. overnight.

The physical properties are reported on Table III.

TABLE III

| EXAMPLE OR COMPARATIVE EXPERIMENT | A | 4 | 5 | 6 | 7 | 8 | 9 |
|---|---|---|---|---|---|---|---|
| Cured Properties at Room Temperature (RT) | | | | | | | |
| Tensile Strength, psi | 5600 | 5370 | 7600 | 4100 | 1240 | 1350 | 4450 |
| Tensile Strength, MPa | 38.6 | 37.0 | 52.4 | 28.3 | 8.6 | 9.3 | 30.7 |
| Elongation, % at Break | 430 | 400 | 470 | 450 | 440 | 1000 | 510 |
| 100% Modulus, psi | 1500 | 1700 | 1190 | 900 | 860 | 1220 | 860 |
| 100% Modulus, MPa | 10.3 | 11.7 | 8.2 | 6.2 | 5.9 | 8.4 | 5.9 |
| 300% Modulus, psi | 2750 | 3400 | 2450 | 1850 | 1030 | — | 1400 |
| 300% Modulus, MPa | 18.9 | 23.4 | 16.9 | 12.8 | 7.1 | — | 9.6 |

Dispersion procedure used was similar to Example 7. The water dispersion viscosity at 63° C. is 30 cps. A cast film (0.25 mm) was prepared, dried overnight at room temperature and final heat cured at 135° C. for 2 hours. The physical properties of the cast film were reported in Table III.

EXAMPLE 9

[(Example of Bis(4,-isocyanotocyclohexyl) methane (HMDI)/PTMG type].

PREPARATION OF PREPOLYMERS

A prepolymer is prepared under nitrogen in a reactor by slowly adding, with stirring 67.51 parts of polytetramethyleneether glycol (having a number average molecular weight of about 1000) to 32.49 parts of Bis(-4,isocyanotocyclohexyl) methane at 30° C. The temperature then rises slowly to 122° C. by control heating, making allowances for the exotherm, to carry the temperature to 122° C., cool if needed to maintain below 125° C. Maintain temperature at 120°-125° C. for about 4 hours.

The reaction is continued until an isocyanate content of 4.55-4.75 is obtaied. The resulting product is a clear liquid having a viscosity of about 10,000 cps (Brookfield) at 50° C.

PREPARATION OF BLOCKED PREPOLYMERS

To 100 parts of prepolymer in a reaction under nitrogen at 60°-65° C. prepared as in example above is slowly added 10.8 parts of MEKO with stirring. The addition rate is adjusted same as in Example 2 and prepared as in #2 with exception that the temperature is controlled at 80° C. for 1½ hours. The reaction is cooled and 1.7 parts of Tween 80 and 9.4 parts of Span-80 are blended into the prepolymer. The resulting "blocked" composition is a clear "liquid" having a Brookfield viscosity of approximately 30,000 cps at 50° C.

| Prepolymer properties of Example 9. | |
|---|---|
| Total % NCo | 3.70 |
| % free MEKO | 1.0 |
| Free % NCo | 0.00 |

Water Dispersion: (procedure same as previous examples).

| Ingredients | Conditions | Weight % |
|---|---|---|
| Prepolymer #8 | 70° C. | 57.65 |
| DETDA (95% theory) | 69° C. | 4.30 |
| Water | 65° C. | 38.05 |

COMPARATIVE EXAMPLE A

A conventionally prepared elastomer was prepared using the ketoxime blocked PTMG/TDI prepolymer of Example 1 but without any emulsifier being added. The sample was processed by conventional solvent technique for casting film. A film was cast after 5-15% solvent of the type Cellosolve Acetate was added to the blocked prepolymer to reduce viscosity for film casting. It was heated to 60° C. and 33% solution of MDA (in similar solvent) was added at 95% theory. Comparative Example A test sheets were prepared by reacting the solvent-free sheets at 130° C. for 1 hour to give elastomeric polyurethane.

Table III sets over the physical properties of the Comparative A polymer, prepared by conventional methods as well as the physical properties of the polyurethanes of Examples 4 to 9.

What is claimed is:

1. A method of manufacturing a water emulsifiable isocyanate endcapped polyol prepolymer comprising the steps of:
    (a) contacting a polyol with a stoichemetric excess of an organic diisocyanate to form an isocyanate endcapped polyol prepolymer having an excess of free isocyanate;
    (b) reacting said isocyanate endcapped polyol prepolymer with a volatile ketoxime in an amount sufficient to react with said prepolymer and to eliminate the free isocyante to form a ketoxime blocked isocyante endcapped polyol prepolymer;
    (c) mixing said ketoxime blocked prepolymer with a non-reactive emulsifier to form a water emulsifiable prepolymer;
    (d) adding curative selected from the group consisting of organic diamines or organic diols to said emulsifiable prepolymer; and
    (e) blending said emulsifiable prepolymer and curative into water to form a stable emulsion.

2. A method according to claim 1 wherein said polyol is a polyester or polyether polyol.

3. A method according to claim 2 wherein said polyester polyol or polyether polyol is selected from the group consisting of polytetramethylene ether glycol, polyethylene butylene, adipate glycol, polypropylene glycol, polyethylene propylene adipate glycol.

4. A method according to claim 1 wherein said polyol is a caprolactone polyester.

5. A method according to claim 1 wherein said organic diisocyanate is selected from the group consisting of toluene diisocyanate, diphenylmethane diisocyanate and 4,4'-dicyclohexylmethane diisocyanate.

6. A method according to claim 1 wherein said curative is selected from the group consisting of methylene dianiline, diethyl toluene diamine, tertiary butyl toluene diamine and dimethylthiotoluene diamine, 4,4'-methylene-bis(3-chloro-2,6 diethyl) aniline.

7. A method accordig to claim 1 wherein said steps (c) and (d) are performed substantially simultaneously.

8. A method according to claim 1 wherein said ketoxime has a molecular weight of less than 200.

9. A method according to claim 1 wherein said ketoxime is selected from the group consisting of acetone oxime, methyl ethyl ketone oxime, methyl isobutyl ketone oxime, cyclohexanone oxime, acetophenone oxime and benzophenone oxime.

10. A method according to claim 1 wherein said non-reactive emulsifier is a form of at least one non-ionic or anionic surfactant.

11. A method according to claim 1 wherein at least a portion of said non-reactive emulsifier is a non-ionic polyol surfactant.

12. A method according to claim 1 wherein said non-reactive emulsifier comprises a blend of a sorbitan ester and a polyoxyethylene sorbitan ester.

13. A method of manufacturing a polyurethane from a water emulsion comprising the steps of:
 (a) emulsifying a ketoxime-blocked isocyanate endcapped polyol prepolymer with a non-reactive emulsifier to form an emulsifiable prepolymer;
 (b) adding a curative selected from the group consisting of organic diamines and organic diols to said emulsifiable prepolymer to form a reactive mixture;
 (c) adding said reactive mixture to water to form a stable reactive emulsion;
 (d) removing said water from said stable reactive emulsion;
 (e) volatilizing a free ketoxime from said stable reactive prepolymer to yield an unblocked isocyanate endcapped polyol prepolymer in the presence of said curative; and
 (f) reacting said curative and said unblocked isocyanate endcapped polyol prepolymer to form a polyurethane.

14. A method according to claim 13 wherein said polyol prepolymer is a polyester polyol or polyether polyol.

15. A method according to claim 13 wherein said polyester or polyether polyol is selected from the group consisting of polytetramethylene ether glycol, polyethylene butylene adipate glycol, polypropylene glycol, polyethylene propylene adipate glycol.

16. A method according to claim 13 wherein said polyol is acaprolactone polyester.

17. A method according to claim 13 wherein said organic diisocyanate is selected from the group consisting of toluene diisocyanate, diphenylmethane diisocyanate ad 4,4'-dicyclohexylmethane diisocyanate.

18. A method according to claim 13 wherein said curative is selected from the group consisting of methylene dianiline, and diethyl toluene diamine, tertiary butyltoluene diamine, 4,4 methylene bis(3-chloro-2,6, diethyl)aniline and dimethylthiotoluene diamine.

19. A method according to claim 13 wherein said non-reactive emulsifier is a form of at least one non-ionic or anionic surfactant.

20. A method according to claim 13 wherein said non-reactive emulsifier comprises a blend of sorbitan ester and a polyoxyethylene sorbitan ester.

21. A method of manufacturing a water emulsifiable isocyanate endcapped polyalkylene polyol prepolymer comprising the steps of:
 (a) contacting a polyalkylene polyol with a stoichemetric excess of an organic diisocyanate to form an isocyante endcapped polyalkylene polyol prepolymer having an excess of free isocyanate;
 (b) reacting said isocyante endcapped polyalkylene polyol prepolymer with a volatile ketoxime in an amount sufficient to react with said prepolymer and to eliminate the free isocyanate to form a ketoxime blocked isocyanate endcapped polyalkylenepolyol prepolymer; and
 (c) mixing said ketoxime blocked prepolymer with a non-reactive emulsifier to form a water emulsifiable prepolymer.

22. A method according to claim 21 wherein said polyalkylene polyol is a polyalkylene ether glycol.

23. A method according to claim 21 wherein said polyalkylene ether glycol is selected from the group consisting of polytetramethylene ether glycol, polyethylene butylene, adipate glycol, polypropylene glycol, polyethylene propylene adipate glycol.

24. A method according to claim 21 wherein said polyalkylene polyol is a caprolactone polyester.

25. A method according to claim 21 wherein said organic diisocyanate is selected from the group consisting of toluene diisocyanate, diphenylmethane diisocyanate and bis(4-isocyanatocyclohexyl)methane.

26. A method according to claim 21 wherein said curative is selected from the group consisting of methylene, dianiline, diethyl toluene diamine, tertiary butyltoluene diamine, 4,4' methylene bis (3-chloro-2,6 diethyl)aniline.

27. A method according to claim 21 wherein said steps (d) and (e) are performed substantially simultaneously.

28. A method according to claim 21 wherein said ketoxime has a molecular weight of less than 200.

29. A method according to claim 21 wherein said ketoxime is selected from the group consisting of acetone oxime, methyl ethyl ketone oxime, methyl isobutyl ketane oxime, cyclohexamone oxime, acetophenone oxime and benzophenone oxime.

30. A method according to claim 21 wherein said non-reactive emulsifier is a form of at least one non-ionic or anionic surfactant.

31. A method according to claim 21 wherein at least a portion of said non-reactive emulsifier is an non-ionic polyol surfactant.

32. An emulsifiable, isocyanate endcapped polyol composition comprising:
 A ketoxime blocked isocyanate endcapped polyol and an emulsifier.

33. A composition according to claim 32 further comprising a curative selected from the group consisting of organic diamines and organic diols.

* * * * *